(12) United States Patent
Ninomiya et al.

(10) Patent No.: US 6,610,233 B1
(45) Date of Patent: Aug. 26, 2003

(54) SAPONIFIED ETHYLENE-VINYL ACETATE COPOLYMER PELLETS AND METHOD FOR THEIR PRODUCTION

(75) Inventors: Kenji Ninomiya, Ibaraki (JP); Makoto Kunieda, Kurashiki (JP); Ikko Matsui, Kurashiki (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/425,729

(22) Filed: Oct. 22, 1999

(30) Foreign Application Priority Data

Oct. 22, 1998 (JP) .......................................... 10/300832

(51) Int. Cl.⁷ .................................................. D01F 6/14
(52) U.S. Cl. ........................ 264/185; 264/28; 264/118; 264/143; 525/61
(58) Field of Search ........................... 525/61; 264/118, 264/143, 185, 28

(56) References Cited

U.S. PATENT DOCUMENTS 4,547,329 A * 10/1985 Dombroski et al. ........ 264/118
4,753,760 A * 6/1988 Kawaguchi et al. .......... 264/28
6,232,382 B1 * 5/2001 Ninomiya et al. .......... 524/400

FOREIGN PATENT DOCUMENTS

| JP | 53120767 | * | 10/1978 |
| JP | 362106904 A | * | 5/1987 |
| JP | 62-106904 | | 5/1997 |

* cited by examiner

Primary Examiner—Judy M. Reddick
(74) Attorney, Agent, or Firm—Armstrong, Westerman & Hattori, LLP

(57) ABSTRACT

The invention provides pellets of a saponified ethylene-vinyl acetate copolymer which are excellent in feedability, cause little fluctuation of extruder torque or discharge during molding, and yield shaped articles with high dimensional accuracy such as the high accuracy of form and thickness. The pellets of the invention are such that the differential curve representing the magnitude of change in the cumulative pore volume curve generated by measuring the fractional volume of surface pores by the mercury intrusion method has no peak within the pore diameter range of $1\times10^2 \sim 1\times10^4$ Å.

1 Claim, 4 Drawing Sheets

US 6,610,233 B1

SAPONIFIED ETHYLENE-VINYL ACETATE COPOLYMER PELLETS AND METHOD FOR THEIR PRODUCTION

TECHNICAL FIELD

The present invention relates to saponified ethylene-vinyl acetate copolymer (hereinafter referred to briefly as EVOH) pellets and a method of producing the same. More particularly, the invention relates to EVOH pellets which are good in feedability for melt-molding (the ease with which the extrusion molding machine can be loaded with the resin), little fluctuation of machine torque and discharge amount during molding and very satisfactory in the dimensional accuracy of moldings and to a method of producing the pellets.

PRIOR TECHNOLOGY

Generally speaking, EOVH is excellent in clarity, gas-barrier properties, aroma retention, solvent resistance, oil resistance and other properties, and by exploiting those characteristics, has been used as molded into various shaped articles inclusive of films and sheets for the packaging of foods, pharmaceuticals, industrial chemicals, agrochemicals, etc. and containers such as bottles.

Molding of EVOH pellets into such shaped articles is usually carried out by loading an extrusion or other molding machine with pellets of EVOH and melt-molding the pellets into a film or sheet but the desired EVOH moldings are sometimes not obtained depending on properties of the pellets used. For example, the deterioration of dimensional accuracy such as the accuracy of form and thickness is sometimes encountered. Therefore, the properties of pellets are important considerations. Considering the circumstances, Japanese Patent Publication (Tokkyo Koho) S47-38634 proposes a method of preparing pellets of EVOH which comprises extruding a solution of EVOH in methanol-water in the form of a strand or strands into a coagulation medium such as water or methanol-water at or below 50° C. Kokai Tokkyo Koho S53-9898 describes a process for producing spherical EVOH pellets which comprises ejecting a slurry of EVOH from a die orifice into water or methanol-water and immediately shearing the EVOH extrudate with a cutter. Kokai Tokyo Koho S53-120767 discloses a process for producing EVOH pellets which comprises delivering a strand of coagulated EVOH through a special duct to a cutting stage. Kokai Tokkyo Koho S62-106904 describes a process for producing EVOH pellets which comprises extruding an EVOH solution supplemented with a lubricant in the form of a strand into a coagulation bath, and Kokai Tokkyo Koho H3-61507 describes a process for producing EVOH pellets which comprises transferring an EVOH strand via a belt conveyor to a cutting stage and cutting the strand under spray with water.

However, according to the technology described in Tokkyo Koho S47-38634, Kokai Tokkyo Koho S53-9898 or Kokai Tokkyo Koho S62-106904, the feedability of EVOH ill pellets for melt molding is poor, and in the technology described in Kokai Tokkyo Koho S53-120767 and Kokai Tokkyo Koho H3-61507, the comparatively uniform shape of pellets contributes to improved feedability in a certain measure but there remains some room for improvement.

The demand for improved accuracy in the form and thickness of molded articles is getting more and more stringent and the advent of EVOH pellets satisfying the above demand is awaited in earnest.

SUMMARY OF THE INVENTION

Under the circumstances, the present inventor conducted an intensive investigation and found that EVOH pellets such that the differential curve representing the magnitude of change in the cumulative pore volume curve constructed by measuring the fractional volume of surface pores by the mercury intrusion method has no peak in the pore diameter range of $1\times10^2 \sim 1\times10^4$ Å (more preferably $1\times10^2 \sim 5\times10^5$ Å provide a neat solution to the above problem. The present invention has come forth from the above finding.

The differential curve representing the magnitude of change in a cumulative pore volume curve as the term is used in the context of this invention means the curve representing the magnitude of change as constructed by differentiation of a cumulative pore volume curve showing the change in volume of the mercury forced into pores as measured by the mercury intrusion method.

DETAILED DESCRIPTION OF THE PREFERRED EMBODIMENTS

Figure 1:
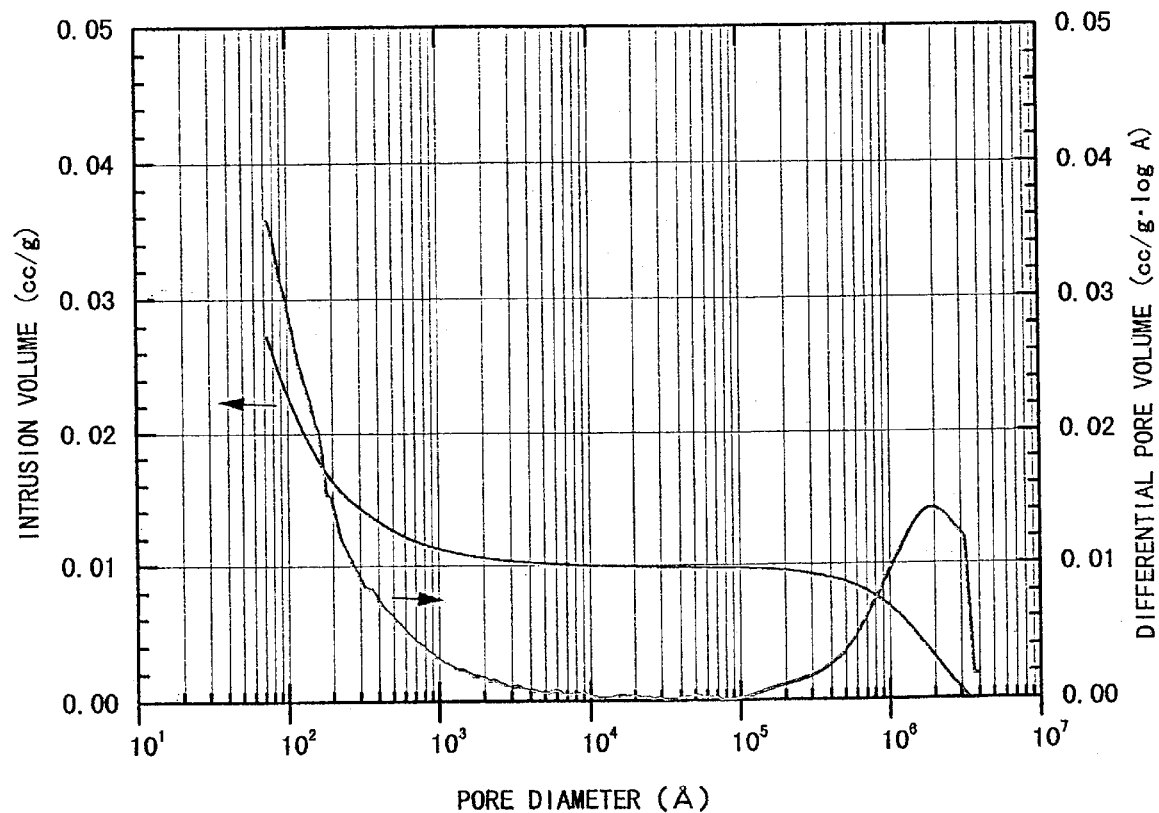
FIG. 1 is a chart showing a cumulative pore volume curve (the left-hand scale on the ordinate) as measured by the mercury intrusion method in Example 1 and its differential curve (the right-hand scale on the ordinate).

The present invention is now described in detail.

EVOH for use as the starting material for the EVOH pellets of this invention is not particularly restricted but is generally an EVOH species having an ethylene content of 20~60 mol % (preferably 25~55 mol %) and a saponification degree of not less than 90 mol % (preferably not less than 95 mol %). If the ethylene content is less than 20 mol %, both gas barrier properties under high humidity conditions and melt moldability are compromised. Conversely, if the upper limit of 60 mol % is exceeded, no sufficient gas barrier properties will be attained. Furthermore, if the degree of saponification is less than 90 mol %, gas barrier properties, thermal stability and moisture resistance will not be satisfactory.

In addition, the melt flow rate (MFR) (210° C., load 2160 g) of the EVOH is preferably 0.1~100 g/10 min. (more preferably 0.5~50 g/10 min.). If the MFR is lower than said range, the torque within the extruder will become so high during molding that the operation will be rendered difficult. Conversely, if the MFR is higher than the above range, the mechanical strength of the shaped article will become insufficient.

The above-mentioned EVOH can be obtained by saponifying a ethylene-vinyl acetate copolymer and this ethylene-vinyl acetate copolymer can be produced by the known polymerization technology inclusive of solution polymerization, suspension polymerization and emulsion polymerization. The saponification of the ethylene-vinyl acetate copolymer can also be carried out by the known technology.

In the practice of the present invention, one or more copolymerizable ethylenically unsaturated monomers can be used as additional comonomers within the quantitative range not detrimental to the effect of the invention. As such comonomers, there can be mentioned various olefins such as propylene, 1-butene, isobutene, etc., unsaturated acids such as acrylic acid, methacrylic acid, crotonic acid, phthalic acid (anhydride), maleic acid (anhydride), itaconic acid (anhydride), etc., inclusive of salts thereof, $C_{1-18}$ mono- or dialkyl esters thereof, acrylamides such as acrylamide, N—$C_{1-18}$ alkylacrylamides, N,N-dimethylacrylamide, 2-acrylamidopropanesulfonic acid and its salts, acrylamidopropyldimethylamine and its acid salts or quaternary salts, methacrylamides such as methacrylamide, N—$C_{1-18}$ alkylmethacrylamide, N,N-dimethylmethacrylamide, 2-methacrylamidopropane-sulfonic acid and its salts, methacrylamidopropyl-dimethylamine and its acid salts or quaternary salts, N-vinylamides such as N-vinylpyrrolidone, N-vinylformamide, N-vinylacetamide, etc., vinyl cyanides such as acrylonitrile, methacrylonitrile, etc., vinyl ethers such as $C_{1-18}$ alkyl vinyl ethers, hydroxyalkyl vinyl ethers, alkoxyalkyl vinyl ethers, etc., vinyl halides such as vinyl chloride, vinylidene chloride, vinyl fluoride, vinylidene fluoride, vinyl bromide, etc., vinylsilanes such as trimethoxyvinylsilane etc., allyl acetate, allyl chloride, allyl alcohol, dimethylallyl alcohol, trimethyl(3-acrylamido-3-dimethylpropyl)ammonium chloride, acrylamido-2-methylpropanesulfonic acid and so forth.

While the EVOH pellets of the invention are produced from the above EVOH, it is essential that the EVOH pellets should be such that the differential curve representing the magnitude of change in the cumulative pore volume curve generated by measuring the fractional volume of surface pores by the mercury intrusion method has no peak within the pore diameter range of $1\times10^2 \sim 1\times10^4$ Å (preferably $1\times10^2 \sim 5\times10^5$ Å). Any EVOH pellets not satisfying the above requirement cannot provide the effect of the invention. Thus, referring to FIG. 4 (the right-hand scale on the ordinate), EVOH pellets having a peak within said range will not provide for uniform feeding in the melt-molding process so that the object of the invention cannot be accomplished.

The reason why EVOH pellets which do not have such a peak are capable of accomplishing the object of the invention is not clear enough but it is suspected that the slidability of pellets within the hopper of the extruder is locally made non-uniform by some action exerted by the surface pores having a unique form.

Furthermore, in accordance with the present invention, a more prominent effect can be obtained in the absence of said peak within the mean pore diameter of $1\times10^2 \sim 5\times10^5$ Å.

The method for preparing such EVOH pellets of this invention is not particularly restricted. Thus, by selecting various pelletizing conditions judiciously, the desired EVOH pellets can be obtained as follows.

Thus, the conventional process for pelletizing EVOH comprises extruding a solution of EVOH in a strand form into a coagulation bath, cutting the coagulated strand into pellets, optionally rinsing the pellets with water, and drying them. The EVOH pellets of the present invention can be obtained by controlling the following parameters: (1) concentration of EVOH solution, (2) extruding temperature of EVOH solution, (3) kind of solvent used for EVOH solution, (4) composition of coagulation bath, (5) temperature of coagulation bath, (6) residence time of EVOH strand in coagulation bath, (7) amount of carboxylic acid or its 1metal salt or ester in coagulation bath, (8) weight ratio of coagulation bath to EVOH strand, (9) strand diameter and pellet length after cutting; in the aqueous rinse stage, (10) temperature of rinse water, (11) rinse time, (12) weight ratio of rinse water to EVOH pellets; and in the drying stage, (13) temperature of heating gas, (14) water content of heating gas, (15) linear velocity and flow rate of heating gas and (16) degree of stirring or fluidization, is done, for drying.

The objective EVOH pellets can be produced with advantage by controlling, among the above-mentioned parameters, the concentration of EVOH in the EVOH solution to be pelletized within the range of 20~50 weight %, the composition of the solvent for EVOH to a mixture of water and alcohol having a water-to-alcohol ratio of 80/20~2/98 by weight and satisfying the relation of $2.55E-40.75 \leq A \leq 2.55E-15.75$ (where A represents the proportion (weight %) of the alcohol and E represents the ethylene content (mol %) of EVOH), the temperature of the coagulation bath within the range of $-10\sim40°$ C., the temperature of water for use in the aqueous rinse stage within the range of $10\sim40°$ C., the water content of the heating gas for use in the drying stage within the range of 0.5~2.5 weight %, and the initial temperature of heating gas within the range of $40\sim95°$ C.

The process for producing the EVOH pellets according to the invention is now described in detail. The starting EVOH solution can be prepared by using substantially any suitable solvent capable of dissolving EVOH. There is no limitation on the kind of solvent that can be used, nor is the preparation procedure restricted. Thus, the solvent which can be used includes but is not limited to methanol, ethanol, propanol, phenol, dimethyl sulfoxide (DMSO), N,N-dimethylformamide (DMF) and hexafluoroisopropyl alcohol (HFIP) and aqueous solutions of such solvents (mixed solvents). Particularly preferred, among them, is a mixture of water and a lower alcohol containing 1~4 carbon atoms (mixed solvent) The preferred mixed solvent has a water-to-alcohol ratio, by weight, of 80/20~2/98 and an alcohol content A (weight %) satisfying the following relation (1). The preferred amount of EVOH in the solution is 20~55 weight % (particularly 25~50 weight %).

$$2.55E-40.75 \leq A \leq 2.55E-15.75 \quad (1)$$

where E represents the ethylene content (mol %) of EVOH.

The procedure for preparing said solution includes (a) one which comprises dissolving EVOH powders or pellets in a solvent or mixed solvent to a predetermined concentration, (b) one which comprises adding a solvent, water or a mixed solvent in a suitable amount to a solvent solution of EVOH after the saponification stage in the EVOH production process, and (c) dissolving the hydrous EVOH pellets, after precipitation (coagulation) or precipitation-aqueous rinse, in a solvent or a mixed solvent to a predetermined concentration and composition. For a production-scale operation, the procedure (b) is preferred.

Then, the EVOH solution prepared as above is extruded in a strand form and pelletized. The solution may be used as it is or be concentrated to a suitable concentration, or even be diluted with water in advance of extrusion. In this stage, there may be formulated a lubricant such as saturated fatty acid amides (e.g. stearamide), unsaturated fatty acid amides (e.g. oleamide), bis-fatty acid amides (e.g. ethylene bisstearamide), fatty acid metal salts (e.g. calcium stearate), low molecular polyolefins (e.g. low molecular polyethylene or polypropylene within the molecular weight range of about 500~10,000), etc., an inorganic salt (e.g. hydrotalcite), a plasticizer (such as aliphatic polyols, e.g. ethylene glycol, glycerin, hexanediol, etc.), an antioxidant (e.g. Ciba-Geigy's Irganox 1098), an ultraviolet absorber, a color, an antimicrobial agent, an antiblocking agent (e.g. finely divided talc), and a slip agent (e.g. amorphous silica).

The coagulation bath for EVOH precipitation which can be used includes but is not limited to water, water-alcohol mixtures, aromatic hydrocarbons such as benzene etc., ketones such as acetone, methyl ethyl ketone, etc., ethers such as dipropyl ether etc., and organic acid esters such as methyl acetate, ethyl acetate, methyl propionate, etc., although either water or a mixture of water and an alcohol is preferred.

The alcohol for use in such a water-alcohol mixture includes lower alcohols such as methanol, ethanol, propanol, etc. but is preferably methanol. The alcohol content of the water-alcohol mixture is preferably not greater than 10% in order that the loss of EVOH resin may be minimized.

The temperature at which the EVOH solution is brought into contact with the coagulation bath is preferably −10~40° C., more preferably 0~2° C., and most preferably 0~10° C. Since the organic solvent mentioned above is a non-solvent for the saponification product, there is substantially no risk for resin loss due to dissolution but, to be on the safe side, the procedure is preferably carried out at as low a temperature as practicable.

The EVOH solution is extruded from a nozzle of suitable geometry in a strand form into said coagulation bath. The nozzle geometry is not particularly restricted but is preferably cylindrical, measuring 1~100 cm long, more preferably 3~30 cm long, and 0.1~10 cm in inside diameter, more preferably 0.2~5.0 cm in inside diameter.

While the EVOH solution is thus extruded in the manner of a strand, the strand need not be singular but a plurality of strands ranging from several to a few hundreds can be extruded simultaneously.

The EVOH strand so extruded is cut after its coagulation has progressed to a sufficient degree and the resulting pellets are rinsed with water. The size of pellets, when they are cylindrical, is preferably 2~8 mm in diameter and 2~8 mm long (more preferably 2~5 mm for both dimensions) and, when they are spherical, is preferably 2~8 mm in diameter (more preferably 2~5 mm).

As regards the conditions of aqueous rinse, the pellets are rinsed with water in a water tank controlled at a water temperature of 10~40° C. (preferably 20~40° C.). By this aqueous rinse, the oligomers and contaminants in the EVOH are removed. The rinsed pellets are then carried through a drying stage, whereby the objective IBM EVOH pellets are obtained.

While a variety of drying methods can be utilized, fluidized drying is preferred for the purposes of this invention. Particularly preferred is a drying method including a stationary drying step either before or after fluidized drying. Thus, (1) a method of carrying out stationary drying after fluidized drying or (2) a method of carrying out fluidized drying after stationary drying (the former method (1) is more preferred) is recommended. The drying technology is now described in detail.

Fluidized drying as the term is used in the context of this invention means a drying process in which EVOH pellets are dried while they are agitated and dispersed either mechanically or by a hot air current and the equipment which can be used for this type of drying includes a cylindrical channel-type stirring dryer, a drum dryer, a rotary dryer, a fluidized-bed dryer, a vibrating fluidized-bed dryer and a conical rotating dryer, among others. Stationary drying as the term is used in the context of this invention generally means a drying process in which EVOH pellets are dried substantially without being subjected to a dynamic force such as stirring and dispersion and the equipment which can be used for this type of drying includes but is not limited to a batch box dryer, to mention an example of the equipment of the load standstill type, and a band dryer, a tunnel dryer and a vertical silo dryer to mention a few examples of the drying equipment of the load conveyance type.

The method in which stationary drying is carried out before fluidized drying is first described in further detail.

The heating gas for said fluidized drying is air or an inert gas (nitrogen gas, helium gas, argon gas, etc.). The temperature of the heating gas is preferably 40~95° C., more preferably 60~90° C. The water content of the heating gas is preferably 0.5~2.5 weight %, more preferably 0.5~2.0 weight %.

The velocity of the heating gas within the dryer is preferably set at 0.7~10 m/sec., more preferably at 0.7~5.0 m/sec. and most preferably at 1.0~3.0 m/sec. If the gas velocity is less than 0.7 m/sec, the EVOH pellets tend to undergo fusion. Conversely, if the upper limit of 10 m/sec is exceeded, the EVOH pellets may undergo chipping, for instance.

The usual fluidized drying time, which depends on the amount of EVOH pellets to be treated, is preferably 5 minutes to 36 hours and particularly 10 minutes to 24 hours.

While the EVOH pellets are dried by fluidized drying under the above conditions, the water content of the dried EVOH pellets is preferably 5.0~60 weight %, it more preferably 10~55 weight %. If the water content is less than 5.0 weight %, the melt molding of the EVOH pellets after stationary drying will show a fluctuation of discharge. Conversely, if the water content exceeds 60 weight %, the EVOH pellets tend to undergo fusion during the stationary drying phase that follows.

Furthermore, it is preferable that the water content after such fluidized drying be lower by not less than 5.0 weight %, more preferably 10~45 weight %, as compared with the water content prior to fluidized drying. If the reduction in water content is less than 5.0 weight %, the fusion of EVOH pellets tends to occur in the subsequent stationary drying phase.

The EVOH pellets dried by fluidized drying as described above are then subjected to stationary drying. The heating gas for this type of drying is also an inert gas (e.g. nitrogen gas, helium gas, argon gas, etc.) but the temperature of this inert gas is preferably not below 75° C., more preferably 85~150° C. If the gas temperature is below 75° C., the drying time must be protracted too long to be economically tolerable. The water content of the heating gas is preferably 0.5~2.5 weight %, more preferably 0.5~2.0 weight %.

The velocity of the gas within the dryer is preferably less than 1.0 m/sec, more preferably 0.01~0.5 m/sec. If the velocity exceeds 1 m/sec, it will be difficult to keep the EVOH pellets stationary.

The stationary drying time is also dependent on the amount of EVOH pellets to be treated and cannot be stated in general terms but usually is preferably 10 minutes to 72 hours, more preferably 1.0~48 hours. As the EVOH pellets are thus dried in stationary condition, the final dry EVOH pellets are obtained. The water content of the pellets thus dried (final water content) is preferably 0.001~2.0 weight %, more preferably 0.01~1.0 weight %. If the final water content is less than 0.001 weight %, the long-run melt moldability of EVOH pellets tends to deteriorate. Conversely, if the upper limit of 2.0 weight % is exceeded, the shaped article tends to contain air cells.

The method which comprises carrying out fluidized drying after stationary drying is now described.

The conditions of stationary drying according to this method may be basically identical to those of the stationary drying procedure described above but the temperature of the heating gas is preferably controlled within the range of 40~95° C., more preferably 60~90° C. The water content of this heating gas is preferably 0.5~2.5 weight %, more preferably 0.5~2.0 weight %.

The stationary drying time is dependent on the amount of EVOH pellets to be treated but usually is preferably 10 minutes to 48 hours, more preferably 30 minutes to 36 hours.

The water content of the EVOH pellets thus treated is preferably 10~70 weight %, more preferably 15~60 weight %. If the water content is less than 10 weight %, the final EVOH pellets available after the subsequent fluidized drying tends to give gels and fish eyes on melt molding in not a few instances. Conversely, when the water content exceeds 70 weight %, the EVOH pellets tend to show a fluctuation of extruder discharge in the melt molding process.

Furthermore, the water content of pellets after such stationary drying is preferably lower by at least 3.0 weight %, more preferably by 5.0~30 weight %, as compared with the water content before stationary drying. If the reduction in water content is less than 3.0 weight %, the EVOH pellets may undergo chipping in the subsequent fluidized drying procedure.

The EVOH pellets thus dried by stationary drying are then subjected to fluidized drying. The conditions of this fluidized drying are basically identical to those of the fluidized drying procedure described hereinbefore but the heating gas temperature is preferably set to 80° C. or higher, more preferably to 95~150° C. If the gas temperature is below 80° C., the drying time must be protracted too long to be economically tolerable. The water content of said heating gas is preferably 0.5~2.5 weight %, more preferably 0.5~2.0 weight %.

The fluidized drying time depends on the amount of EVOH pellets to be treated but generally is preferably 10 minutes to 48 hours, more preferably 30 minutes to 24 hours.

By this fluidized drying, the objective EVOH pellets with a water content of 0.001~2.0 weight % can be finally obtained.

The EVOH pellets may optionally contain a variety of additives such as lubricant, plasticizer, thermal stabilizer, ultraviolet absorber, antioxidant, color, antimicrobial agent, oxygen absorber, filler, etc. as well as other resins such as polyolefins and polyamides, among others. Particularly for preventing gelation, hydrotalcite series compounds, hindered phenol series or hindered amine series thermal stabilizers, and higher aliphatic carboxylic acid metal salts may be added.

Furthermore, two or more different species of EVOH may be used as said EVOH. Thus, the use of a blend of EVOH species which differ from each other in ethylene content by 5 mol % or more and/or in the degree of saponification by 1 mol % or more is advantageous in that, while the gas barrier properties are kept intact, secondary processability such as high-draft orientability, vacuum forming quality, and deep-draw forming quality can be improved.

The EVOH pellets produced in the above manner can be melt-molded into a variety of shaped articles such as film, sheet, containers, fiber, rods, tubing or piping, etc. Moreover, reclaimed articles may be crushed and melt-molded again. The melt-molding technology which is chiefly used includes extrusion molding and injection molding. The melt-molding temperature is selected from the range of 150~300° C. in many instances.

The EVOH pellets produced in accordance with this invention may be molded into a single-layer article or processed into a multi-layer laminate article which can be fabricated by laminating a thermoplastic resin film or sheet to at least one side of a layer formed from the EVOH pellets.

The laminate mentioned above is fabricated by laminating a different material to one side or either side of a layer formed from said EVOH pellets. The laminating technology which can be used includes but is not limited to a method which comprises melt-extruding a thermoplastic resin onto a film or sheet molded from said EVOH pellets, a method which conversely comprises melt-extruding the EVOH pellets onto a substrate composed of a thermoplastic resin, for instance, a method which comprises co-extruding said EVOH pellets and other thermoplastic resin pellets, and a dry laminating method which comprises laminating a film or sheet molded from said EVOH pellets to a film or sheet of other material using a known adhesive such as an organotitanium compound, an isocyanate, a polyester or a polyurethane, for instance.

The counterpart resin to be co-extruded includes linear low-density polyethylene, low-density polyethylene, ultra-low-density polyethylene, medium-density polyethylene, high-density polyethylene, ethylene-vinyl acetate copolymer, ionomers, ethylene-propylene copolymer (block or random copolymer), ethylene-acrylic acid copolymer, ethylene-methacrylic acid copolymer, ethylene-acrylic ester copolymers, ethylene-methacrylic ester copolymers, polypropylene, propylene-$\alpha$-olefin ($C_{4-20}\alpha$-olefin) copolymers, olefin homopolymers and copolymers, e.g. polybutene, polypentene, etc., polyolefin resin in a broad sense of the term, inclusive of homopolymers or copolymers of said olefins graft-modified with an unsaturated carboxylic acid or an ester thereof, polyesters, polyamides, copolymerized polyamides, polyvinyl chloride, polyvinylidene chloride, acrylic resins, polystyrene, vinyl ester resins, polyester elastomers, polyurethane elastomers, chlorinated polyethylene, chlorinated polypropylene, polyketones and polyhydric alcohols. Other species of EVOH may also be used for co-extrusion. From the practical standpoints of the ease of formation of a co-extruded film or sheet and the physical properties (particularly strength) of the film or sheet, polyethylene, polypropylene, ethylene-propylene copolymer, ethylene-vinyl acetate copolymer, polyamides, polystyrene, polyethylene terephthalate and polyethylene naphthalate can be used with advantage.

Furthermore, in such applications as a sheet, film or other shaped article molded from the EVOH pellets of the invention is extrusion-coated with a different material or laminated to a film or sheet molded from a different material with the aid of an adhesive, not only said thermoplastic resin but also a variety of substrates such as paper, metal foil, uni- or biaxially oriented plastic film or sheet, woven cloth, non-woven fabric, metal flocs, wood, etc. can be employed.

Now, designating a layer obtained using the EVOH pellets of the invention as a ($a_1$, $a_2$, . . .) and a layer made of a different material, e.g. a thermoplastic resin, as b ($b_1$, $b_2$, . . .), the laminate mentioned above for film, sheet or bottles may assume not only a binary structure of a and b but also any of such multi-layer structures as b/a/b, a/b/a, $a_1/a_2/b$, $a/b_1/b_2$, $b_2/b_1/a/b_1/b_2$1 $b_2/b_1/a/b_1/a/b_1/b_2$, etc. When the laminate to be provided is a filament or the like, it may assume a bi-metal structure of, for example, a and b but also a core (a)-sheath (b) structure or a core (b)-sheath (a) structure, or any of various eccentric core-sheath structures.

The form of the laminate is not restricted but may for example be a film, a sheet, a tape, a cup, a tray, a tube, a bottle, a pipe, a filament, or any profile. Where necessary, the laminate obtained may be subjected to various after-treatments such as heating, cooling, rolling, printing, dry lamination, solution or hot melt coating, bag-making, deep drawing, box-making, tube formation and splitting.

The film, sheet and containers such as cups, trays, tubes, bottles, etc. as obtained in the above manner are useful as packaging materials for foods, pharmaceuticals, industrial chemicals and agrochemicals, to mention just a few examples.

EXAMPLES

The following examples illustrate this invention in further detail, it being to be understood that those examples are not intended to defined the scope of the invention. It should also be understood that all parts and % are by weight unless otherwise specified and that the pore volume (mercury intrusion method) and volatile matter content of EVOH pellets were determined by the following methods.

[Method of Determining the Fractional Pore Volume]

Using an electronic balance, 4~5 g of EVOH pellets are taken. The pellets are placed in a cell and impregnated with mercury under reduced pressure. The cell was mounted on the following apparatus for determination.

Apparatus: Pore Sizer 9320 (Micromeritics)

Pressure range: ca 3.7 kPa~200 MPa

Cell capacity: 15 cm$^3$

[Method for Determination of Volatile Matter Content]

EVOH pellets are weighed using an electronic balance and dried in a hot-air oven dryer maintained at 150° C. for 5 hours. The sample is then allowed to cool in a desiccator for 30 minutes and weighed similarly. The % volatile matter was calculated by means of the following equation.

% Volatile matter=(Sample weight before heating−sample weight after heating/Sample weight before heating)×100

Example 1

A solution of EVOH [ethylene content 35 mol %, degree of saponification 99.5 mol %, MI 12 g/10 m in(210° C., load 2160 g)] in a mixture of water and methanol [H$_2$O/MeOH= 40/60, by weight] (EVOH concentration 40%) was extruded from a cylindrical nozzle in a strand form at a rate of 10 kg/hr into a coagulation bath composed of 5% methanol and 95% water at 5° C. The extrudate was allowed to contact the coagulation bath for 60 seconds and the strand obtained was withdrawn from the bath using a take-up roll disposed at the downstream end of the coagulation equipment.

The methanol content (A) of the solvent in said EVOH solution was 60%, and substituting the above ethylene content value (E=35 mol %) into the relation (1) given in the text gives 48.5≦A≦73.5. Thus, this methanol content (A) satisfied the relation (1).

The strand was then cut with a cutter to give white porous pellets measuring 3.8 mm in diameter and 4 mm long. Those pellets were rinsed with warm water at 30° C. to give porous pellets with a water content of 56%. The pellets were then dried with a nitrogen gas controlled at a temperature of 70r and a water content of 0.6% in a batch gas-circulating box dryer for 12 hours to adjust the water content of the pellets to 30%. The pellets were further dried with a nitrogen gas controlled at a temperature of 120° C. and a water content of 0.5% in a batch tower fluidized-bed dryer for 12 hours to provide the EVOH pellets of the invention.

The fractional volume of pores on the surface of the EVOH pellets thus obtained was determined by the mercury intrusion method. As shown in FIG. 1, the differential curve (the right-hand scale on the ordinate) had no peak within the mean pore diameter range of 1×10$^2$~5×10$^5$ Å. The % volatile matter was 0.3%.

The EVOH pellets obtained as above were molded into a film under the following conditions for 3 hours to evaluate the fluctuations of torque, discharge amount and film thickness.

[Conditions of Film Forming With a Monoaxial Extruder]

| | | |
|---|---|---|
| Screw in. dia. | 40 mm | |
| L/D | 28 | |
| Screw compression ratio | 3.2 | |
| T die | Coat hanger type | |
| Die width | 450 mm | |
| Extrusion temperature | C1: 190° C. | H: 210° C. |
| | C2: 210° C. | D: 210° C. |
| | C3: 220° C. | |
| | C4: 220° C. | |

(Torque Fluctuation)

The screw torque A (amperes) under motor loading (screw speed 60 rpm) of the extruder during continuous film formation was continuously measured and the toque fluctuation was evaluated according to the following criteria.

○ - - - a fluctuation less than ±5%

Δ - - - a fluctuation of ±5%~less than ±10%

× - - - a fluctuation of ±10% or more

[Fluctuation of Discharge]

The amount of EVOH discharged from the extruder during film formation was measured at 1-minute intervals and the fluctuation of discharge was evaluated according to the following criteria.

○ - - - a fluctuation less than ±2%

Δ - - - a fluctuation of ±2%~less than ±5%

× - - - a fluctuation of ±5% or more

[Fluctuation of Film Thickness]

The film thickness in the machine direction (MD) was continuously measured and with a film thickness of 40 μm being taken as the median value, the percent change in thickness was determined and evaluated according to the following criteria.

○ - - - a relative change smaller than ±5%

Δ - - - a relative change of ±5%~less than ±10%

× - - - a relative change of ±10% or more

Example 2

A solution of EVOH [ethylene content 42 mol %, degree of saponification 99.6 mol %, MI 8.0 g/10 min (210° C., load 2160 g)] in a mixture of water and methanol [H$_2$O/MeOH= 25/75, by weight] (EVOH concentration 36%) was extruded from a cylindrical nozzle in a strand form at a rate of 10 kg/hr into a coagulation bath composed of 5% methanol and 95% water at 5° C. The extrudate was allowed to contact the coagulation bath for 80 seconds and the strand obtained was withdrawn from the bath using a take-up roll disposed at the downstream end of the coagulation equipment.

The methanol content (A) of the solvent in said EVOH solution was 75%, and substituting the above ethylene content value (E=42 mol %) into the relation (1) given in the text gives 66.35≦A≦91.35. Thus, this methanol content (A) satisfied the equation (1).

The strand was then cut with a cutter to give white porous pellets measuring 3.8 mm in diameter and 4.0 mm long. Those pellets were rinsed with warm water at 30° C. to give porous pellets with a water content of 60%. The pellets were then dried with a nitrogen gas controlled at a temperature of 70° C. and a water content of 1.0% in a batch gas-circulating box dryer for 16 hours to adjust the water content of the pellets to 32%. The pellets were further dried with a nitrogen gas controlled at a temperature of 120° C. and a water content of 0.6% in a batch tower fluidized-bed dryer for 12 hours to provide the EVOH pellets of the invention.

Figure 2:
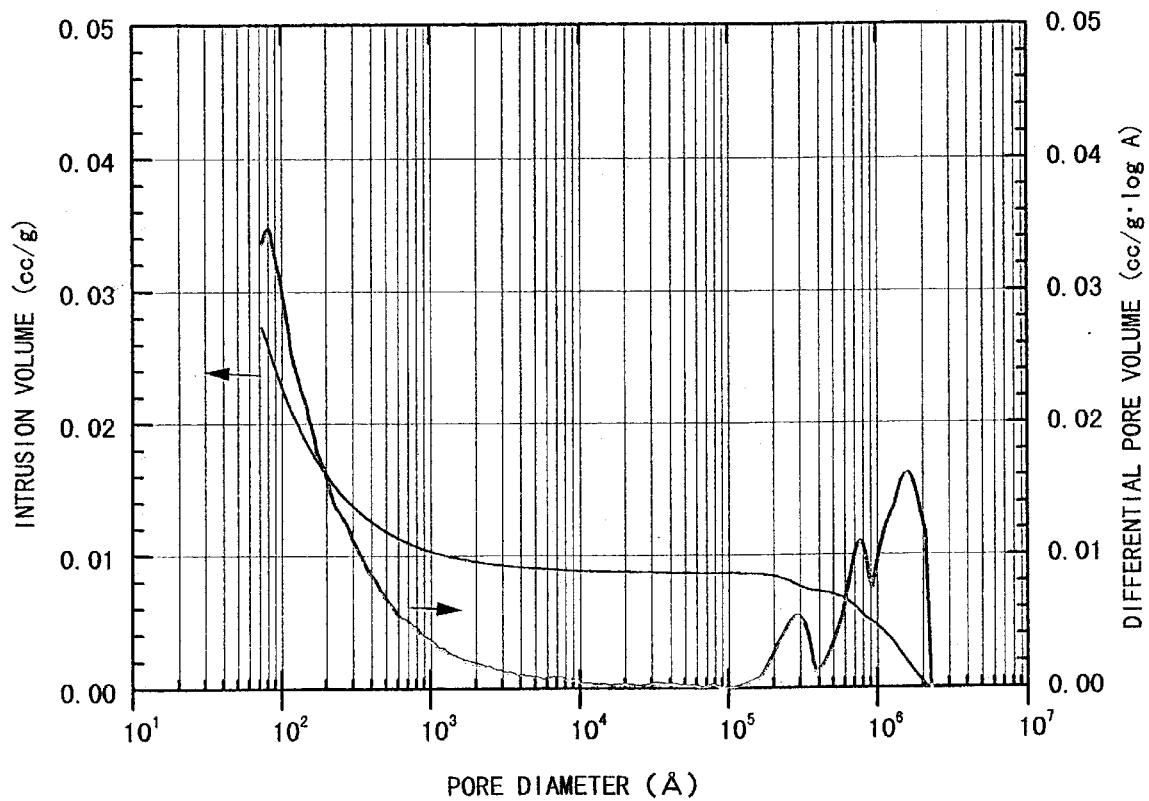
FIG. 2 is a chart showing a cumulative pore volume curve (the left-hand scale on the ordinate) as measured by the mercury intrusion method in Example 2 and its differential curve (the right-hand scale on the ordinate).

The fractional volume of pores on the surface of the EVOH pellets thus obtained was determined by the mercury intrusion method. As shown in FIG. 2, the differential curve (the right-hand scale on the ordinate) had no peak within the mean pore diameter range of $1 \times 10^2 \sim 1 \times 10^4$ Å (however, minor peaks were found in the neighborhood of $3 \times 10^5$ Å. The % volatile matter was 0.2%.

The EVOH pellets thus obtained were evaluated as in Example 1.

Example 3

A solution of EVOH [ethylene content 30 mol %, degree of saponification 99.6 mol %, MI 8.1 g/10 min (210° C., load 2160 g)] in a mixture of water and methanol [$H_2O$/MeOH= 60/40, by weight] (EVOH concentration 36%) was extruded from a cylindrical nozzle in a strand form at a rate of 10 kg/hr into a coagulation bath composed of 4% methanol and 96% water at 3° C. The extrudate was allowed to contact the coagulation bath for 120 seconds and the strand obtained was withdrawn from the bath using a take-up roll disposed at the downstream end of the coagulation equipment.

The methanol content (A) of the solvent in said EVOH solution was 40%, and substituting the above ethylene content value (E=30 mol %) into the relation (1) given in the text gives 35.75≦A≦60.75. Thus, this methanol content (A) satisfied the relation (1).

The strand was then cut with a cutter to give white porous pellets measuring 4.2 mm in diameter and 4.5 mm long. Those pellets were rinsed with warm water at 30° C. to give porous pellets with a water content of 59%. The pellets were then dried with a nitrogen gas controlled at a temperature of 75° C. and a water content of 1.0% in a batch tower fluidized-bed dryer for 4 hours to adjust the water content of the pellets to 20%. The pellets were further dried with a nitrogen gas controlled at a temperature of 125° C. and a water content of 0.6% in a batch gas-circulating box dryer for 20 hours to provide the EVOH pellets of the invention.

Figure 3:
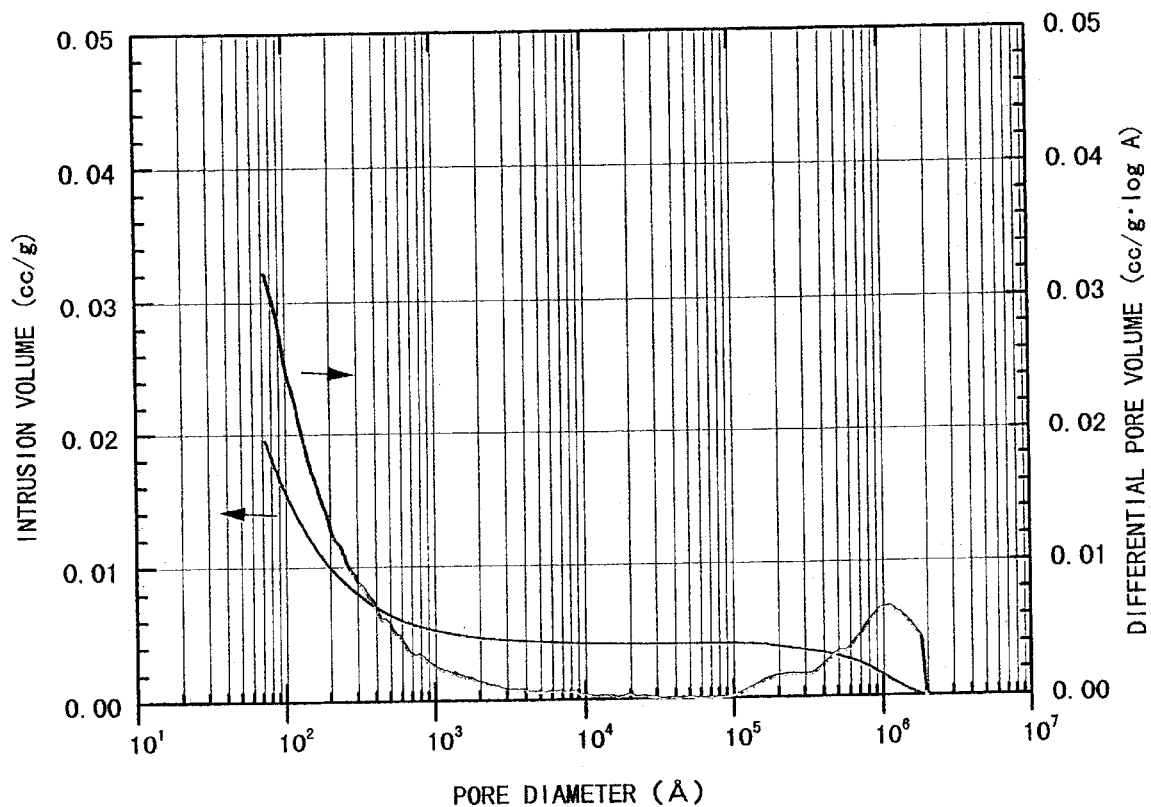
FIG. 3 is a chart showing a cumulative pore volume curve (the left-hand scale on the ordinate) as measured by the mercury intrusion method in Example 3 and its differential curve (the right-hand scale on the ordinate).

The fractional volume of pores on the surface of the EVOH pellets thus obtained was determined by the mercury intrusion method. As shown in FIG. 3, the differential curve (the right-hand scale on the ordinate) had no peak within the mean pore diameter range of $1 \times 10^2 \sim 5 \times 10^5$ Å. The % volatile matter was 0.3%.

The EVOH pellets thus obtained were evaluated as in Example 1.

Comparative Example 1

A solution of EVOH [ethylene content 35 mol %, degree of saponification 99.5mol %, MI 12 g/10min (210° C., load 2160 g)] in a mixture of water and methanol [$H_2O$/MeOH= 60/40, by weight] (EVOH concentration 40%) was extruded from a cylindrical nozzle in a strand form at a rate of 10 kg/hr into a coagulation bath composed of 5% methanol and 95% water at 25° C. The extrudate was allowed to contact the coagulation bath for 10 minutes and the strand obtained was withdrawn from the bath using a take-up roll disposed at the downstream end of the coagulation equipment.

The methanol content (A) of the solvent in said EVOH solution was 40%, and substituting the above ethylene content value (E=35 mol %) into the relation (1) given in the text gave 48.5≦A≦73.5. Thus, this methanol content (A) did not satisfy the relation (1).

The strand was then cut with a cutter to give white porous pellets measuring 3.8 mm in diameter and 4 mm long. Those pellets were rinsed with warm water at 50° C. to give porous pellets with a water content of 56%. The pellets were then dried with a nitrogen gas controlled at a temperature of 70° C. and a water content of 6% in a batch gas-circulating box dryer for 12 hours to adjust the water content of the pellets to 35%. The pellets were further dried with a nitrogen gas controlled at a temperature of 120° C. and a water content of 4% in a batch tower fluidized-bed dryer for 18 hours to provide the EVOH pellets of the invention.

Figure 4:
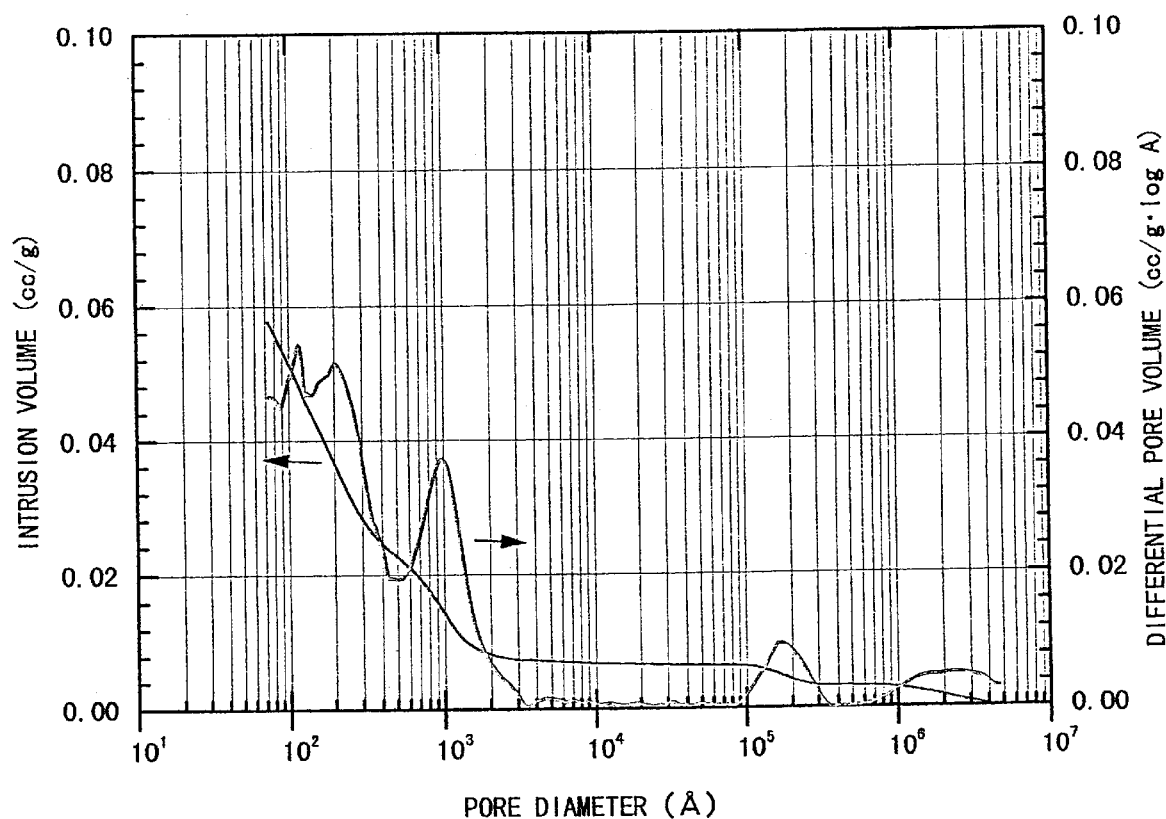
FIG. 4 is a chart showing a cumulative pore volume curve (the left-hand scale on the ordinate) as measured by the mercury intrusion method in Comparative Example 1 and its differential curve (the right-hand scale on the ordinate).

The fractional volume of pores on the surface of the EVOH pellets thus obtained was determined by the mercury intrusion method. As shown in FIG. 4, the differential curve (the right-hand scale on the ordinate) showed definite peaks around $2 \times 10^2$ Å and $1 \times 10^3$ Å (in addition, a further peak was found around $1.5 \times 10^5$ Å) within the mean pore diameter range of $1 \times 10^2 \sim 1 \times 12^4$ Å. The % volatile matter was 0.3%.

The EVOH pellets thus obtained were evaluated as in Example 1.

The results of evaluations of the pellets obtained in the above Examples and Comparative Example 1 are shown together in Table 1.

TABLE 1

|  | Fluctuation of torque | Fluctuation of discharge | Change in film thickness |
| --- | --- | --- | --- |
| Example 1 | ○ | ○ | ○ |
| Example 2 | Δ | ○ | ○ |
| Example 3 | ○ | ○ | ○ |
| Comparative Example 1 | X | Δ | X |

The EVOH pellets of this invention have a characteristic surface pore structure so that they can be fed smoothly to an extruder for melt molding, cause little fluctuation of extruder torque and discharge during molding and yield shaped articles with high dimensional accuracy such as the high accuracy of form and thickness. Furthermore, the pellets can be processed into various laminates. Therefore, the EVOH pellets of the invention are very useful for a variety of uses such as the packaging film and sheet for foods, pharmaceuticals, agrochemicals and industrial chemicals and various containers such as bags, cups, trays, tubes and bottles for such products.

What is claimed is:

1. A process for producing pellets of a saponified ethylene-vinyl acetate copolymer having an ethylene content of 20 to 60 mol % and a saponification degree of not less than 90 mol % which comprises introducing a solution of said saponified ethylene-vinyl acetate copolymer (EVOH) in a solvent into a solidification bath so as to form a precipitate, separating the precipitate from the bath, and drying the resulting precipitate to form pellets, wherein the solvent in said solution of saponified ethylene-vinyl acetate copolymer EVOH is a mixture of water and alcohol in a weight ratio of 80/20 to 2/98 and satisfying the relation of $$2.55E\text{-}40.75 \leq A \leq 2.55E\text{-}15.75,$$

where A represents the alcohol content (weight %) of the solvent and E represents the ethylene content (mol %) of EVOH, wherein said drying is achieved using a heating gas with a water content of 0.5 to 2.5 weight %, and wherein the differential curve representing the magnitude of change in the cumulative pore volume curve of the pellets which is determined by measuring the fractional volume of surface pores by the mercury intrusion method has no peak within the pore diameter range of $1 \times 10_2$ to $1 \times 10_4$ Å.

* * * * *